US012699952B2

(12) United States Patent
Yahia et al.

(10) Patent No.: US 12,699,952 B2
(45) Date of Patent: Aug. 4, 2026

(54) MARINE VESSEL NAVIGATION AND SHIPMENT TRACKING USING MOBILE DEVICE

(71) Applicant: SAUDI ARABIAN OIL COMPANY, Dhahran (SA)

(72) Inventors: Ali O. Yahia, Dammam (SA); Mohammed AlQahtani, Al Khobar (SA); Ahmed A. AlSaghah, Dammam (SA); Abdulrahman AlSalim, Al Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 7 days.

(21) Appl. No.: 18/622,456

(22) Filed: Mar. 29, 2024

(65) Prior Publication Data

US 2025/0307756 A1 Oct. 2, 2025

(51) Int. Cl.
*G06Q 10/083* (2024.01)
*G06Q 10/0833* (2023.01)

(52) U.S. Cl.
CPC ... *G06Q 10/08355* (2013.01); *G06Q 10/0833* (2013.01)

(58) Field of Classification Search
CPC ................................................. G06Q 10/0833
See application file for complete search history.

(56) References Cited

U.S. PATENT DOCUMENTS 9,488,984 B1 11/2016 Williams et al.
11,734,644 B2 8/2023 Skaaksrud 2005/0288986 A1 12/2005 Barts et al.
2012/0259489 A1* 10/2012 Hamamatsu ......... G01C 21/203
701/21
2016/0195399 A1* 7/2016 Nanri ...................... B63B 49/00
701/21

(Continued)

FOREIGN PATENT DOCUMENTS

CN 103854109 A * 6/2014
JP 2006027833 A * 2/2006

(Continued)

OTHER PUBLICATIONS

US Navy, "Charting the Seas" Oct. 12, 2022, Naval History and Heritage Command National Museum of the U.S. Navy, https://www.history.navy.mil/content/history/museums/nmusn/education/educational-resources/to-the-ends-of-the-earth/navigation/charting-the-seas--latitude-and-longitude-activities.html). (Year: 2022).*

(Continued)

*Primary Examiner* — Jessica Lemieux
*Assistant Examiner* — Matthew Parker Goodman
(74) *Attorney, Agent, or Firm* — Osha Bergman Watanabe & Burton LLP

(57) ABSTRACT

Described is a method for marine vessel shipment management. A loading plan with supplies to be shipped on a marine vessel is presented to a user interface of a mobile communication device in communication with other mobile communication devices. Using the user interface, a modifiable passage plan is selected for the loading plan. The passage plan includes a route to an intended destination for delivery of the supplies. Upon delivery of the supplies to the intended destination, a notice of delivery is obtained via the user interface of one or more of the mobile communication devices.

16 Claims, 10 Drawing Sheets

(56)                    References Cited

U.S. PATENT DOCUMENTS

| | | | | |
|---|---|---|---|---|
| 2016/0265920 A1 * | 9/2016 | Yamaguchi | ............. | B63B 49/00 |
| 2019/0219417 A1 * | 7/2019 | Quint | ................. | G01C 21/3632 |
| 2020/0140242 A1 * | 5/2020 | Yan | ........................ | B63H 25/02 |
| 2020/0167726 A1 * | 5/2020 | Lee | .................... | G06Q 10/0835 |
| 2020/0168107 A1 * | 5/2020 | Heine | ...................... | G08G 5/53 |
| 2020/0240787 A1 * | 7/2020 | Jha | .......................... | B63B 49/00 |
| 2021/0326667 A1 * | 10/2021 | Huang | ............. | G06K 19/06028 |

FOREIGN PATENT DOCUMENTS

| | | | | | |
|---|---|---|---|---|---|
| JP | 7165902 | B2 * | 11/2022 | | |
| WO | WO-2006000462 | A1 * | 1/2006 | ............. | G06Q 10/08 |
| WO | WO-2017033308 | A1 * | 3/2017 | ............. | G06Q 50/28 |
| WO | WO-2018168256 | A1 * | 9/2018 | ........... | G06F 3/0393 |
| WO | WO-2020245490 | A1 * | 12/2020 | ........... | G01C 21/203 |

OTHER PUBLICATIONS

Drago, Aldo, "A Smartphone Application Delivering Meteo-Marine Data To the Public"; The Ever Growing Use of Copernicus Across Europe's Regions: A selection of 99 user stories by local and regional authorities; pp. 250-251; 2018 (142 pages).

De Andres Gonzalez, Olena et al., "Digitalization in Just-In-Time Approach as a Sustainable Solution for Maritime Logistics in the Baltic Sea Region"; Sustainability; vol. 13, Issue 3, Article 1173; pp. 1-24; Feb. 2021 (24 pages).

Laoudias, Christos et al., "A Survey of Enabling Technologies for Network Localization, Tracking, and Navigation"; IEEE Communications Surveys & Tutorials; vol. 20, Issue 4; pp. 3607-3644; 2018 (39 pages).

\* cited by examiner

238 — Present loading plan to user using user interface

240 — Approval ? — No — 242

Yes

244 — Present assigned marine vessel using user Interface

246 — Approval ? — No — 248

Yes

250 — Select passage plan for loading plan using user interface

252 — Approval ? — No — 254

Yes

256 — Obtain notice of delivery of supplies using user interface

MARINE VESSEL NAVIGATION AND SHIPMENT TRACKING USING MOBILE DEVICE

BACKGROUND

Oil and gas offshore operations rely primarily on marine vessels for delivery of equipment and materials, which are initially listed in loading plan. Loading plans, generated by planners, include materials and equipment of different sizes that need to be delivered to offshore facilities. Typically, vessels are rented from other entities at a high cost. In some cases, one vessel may serve multiple offshore facilities to decrease turnaround time of the vessels. Vessel captains follow a passage plan to navigate vessels that deliver shipments to offshore platforms. The vessel captains are required to confirm the shipments on the vessel as well as acquire and navigate a passage plan. The processes related to shipping and delivery management are typically performed manually and are labor intensive.

FIG. 1 illustrates a conventional vessel management process. In block 100, supplies are selected for shipment and delivery. A user manually drafts a supply manifest in block 102. The supply manifest is a document with details related to the supplies, materials, equipment, and any other cargo. A user must review the supply manifest, review the available vessels and any additional constraints (e.g., size, location, schedule), and then manually assign the supplies to be loaded onto one or more vessels in block 104. In block 106, a loading plan is generated by a user. Each marine vessel has a loading plan including all of the equipment and/or materials that needs to be delivered to offshore rigs. The vessel is loaded according to the loading plan in block 108. The captain of the marine vessel follows a passage plan that details how to navigate the marine vessel in the water. In block 110, the vessel delivers the supplies to an offshore rig. In block 112, the captain of the vessel reviews the supplies on the vessel, comparing them to a hardcopy of the supply manifest. When the supplies delivered correspond to the manifest, the captain approves the delivery. Each of these tasks is time-consuming and may be error-prone due to the reliance on users to conduct proper and timely record keeping and transfer of information.

In the sector of transport and delivery coordination, there is an interest in decreasing the turnaround time and avoiding delays. As a result of decreasing time, overall costs may be reduced. The use of mobile applications for task completion has several benefits including time saved and reduced costs of overall operations. Thus, a continuing need exists for an automated system and process for managing shipments on marine vessels.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a computer-implemented method for marine vessel shipment management. A loading plan including one or more supplies to be shipped on a marine vessel is presented using a user interface of one or more mobile communication devices in communication with one another. A modifiable passage plan is selected for the loading plan using the user interface of the one or more mobile communication devices. The passage plan includes a route to an intended destination for delivery of the one or more supplies by an assigned marine vessel. A notice of delivery of the one or more supplies to the intended destination is obtained using the user interface of the one or more mobile communication devices.

In another aspect, the loading plan is provided to the user interface of the one or more mobile communication devices for approval by a user.

In another aspect, the passage plan is provided to the user interface of the one or more mobile communication devices for approval by a user.

In another aspect, a recommendation for assignment of the loading plan to the marine vessel is based on at least one of size, location, and availability of a plurality of marine vessels.

In another aspect, the recommendation is provided to the user interface of the one or more mobile communication devices for approval by a user.

In another aspect, at least one waypoint is added to the route in the passage plan using a selectable user interface element of the user interface of the one or more mobile communication devices.

In another aspect, data related to the one or more supplies is input using a selectable user interface element of the user interface of the one or more mobile communication devices, where the data comprises at least one of a textual description and an image.

In another aspect, data related to the assigned marine vessel is displayed using the user interface of the one or more mobile communication devices, wherein the data comprises directional coordinates of at least one waypoint along the route in the passage plan and a selectable user interface element representing an option to add a new waypoint.

In another aspect, data related to delivery of the one or more supplies is logged via the user interface of the one or more mobile communication devices, wherein the data comprises at least one of a weather condition affecting delivery of the one or more supplies and damage to the one or more supplies.

Additionally, embodiments disclosed herein relate to a system for marine vessel shipment management, the system configured to perform the above method.

Other aspects and advantages of the claimed subject matter will be apparent from the following description and the appended claims.

DETAILED DESCRIPTION

Figure 1:
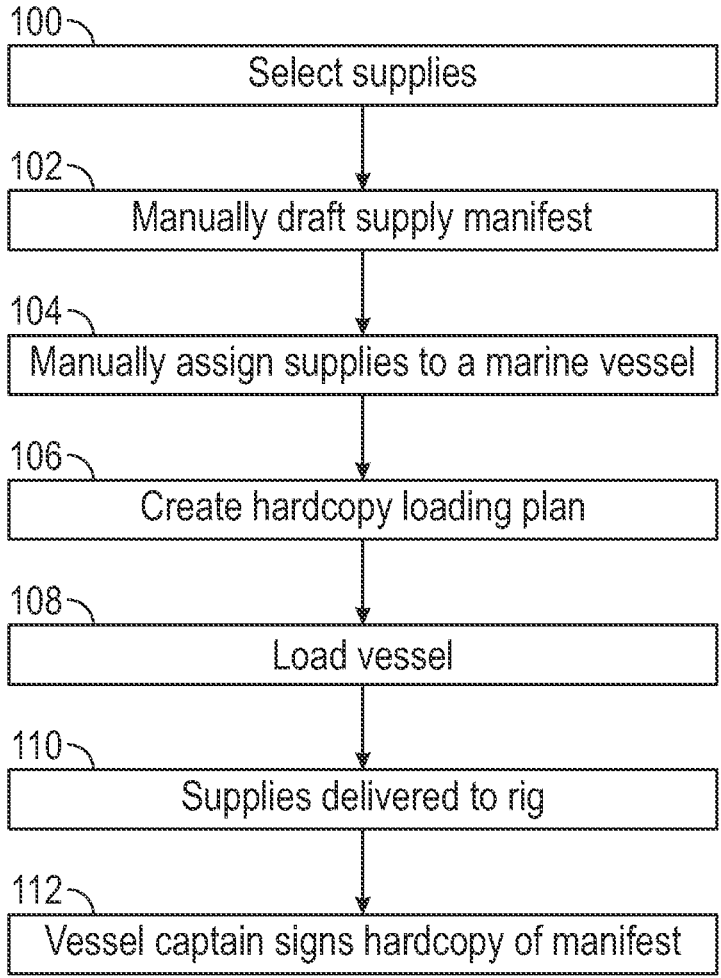
FIG. 1 illustrates a conventional vessel management process.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-9, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a passive soil gas sample system" includes reference to one or more of such systems.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Embodiments of the present disclosure relate to a system for task management. Specifically, embodiments of the present disclosure relate to a system for managing tasks of a marine vessel. Embodiments of the present disclosure relate to a system for managing shipping tasks of a marine vessel. Embodiments of the present disclosure relate to digitizing processes performed at oil and gas offshore facilities. More specifically, embodiments of the present disclosure relate to assisting marine vessel captains with their daily tasks to expedite the processing of shipment deliveries to offshore facilities.

In one or more embodiments, the system is a user device, such as a smartphone, tablet, laptop computer, or desktop computer having one or more computer processors configured to operate a software application. In one or more embodiments, the software application is a mobile software application configured to operate on a mobile communication device in communication with other mobile communication devices to accompany and assist a user. The system described herein may be user-specific for marine vessel captains navigating to offshore facilities as well as other marine vessel and shipping operators.

In one or more embodiments, the user device comprises a display screen, such as a touch screen, configured to receive user inputs. The system receives user input via the user device, and the output of the user device indicates the effects of the user's input. Upon execution of the software application on the user device, a graphical user interface (GUI) is displayed. The user device may also include an image capturing component, such as a camera, and/or a global positioning system (GPS) component to input additional sources of information (i.e., images, localization data) to the software application. The features included in the software application may include processes starting from a user receiving a loading plan for supplies to be transported to the supplies being delivered at a designated offshore facility.

In one or more embodiments, the software application described herein utilizes smartphone technology. For the purposes of this disclosure, the term "user" refers to a marine vessel captain or any user delegated to use the software applications. The software application relies on delivering data to the user to confirm as well as displaying passage plans to navigate and log information.

Figure 2A:
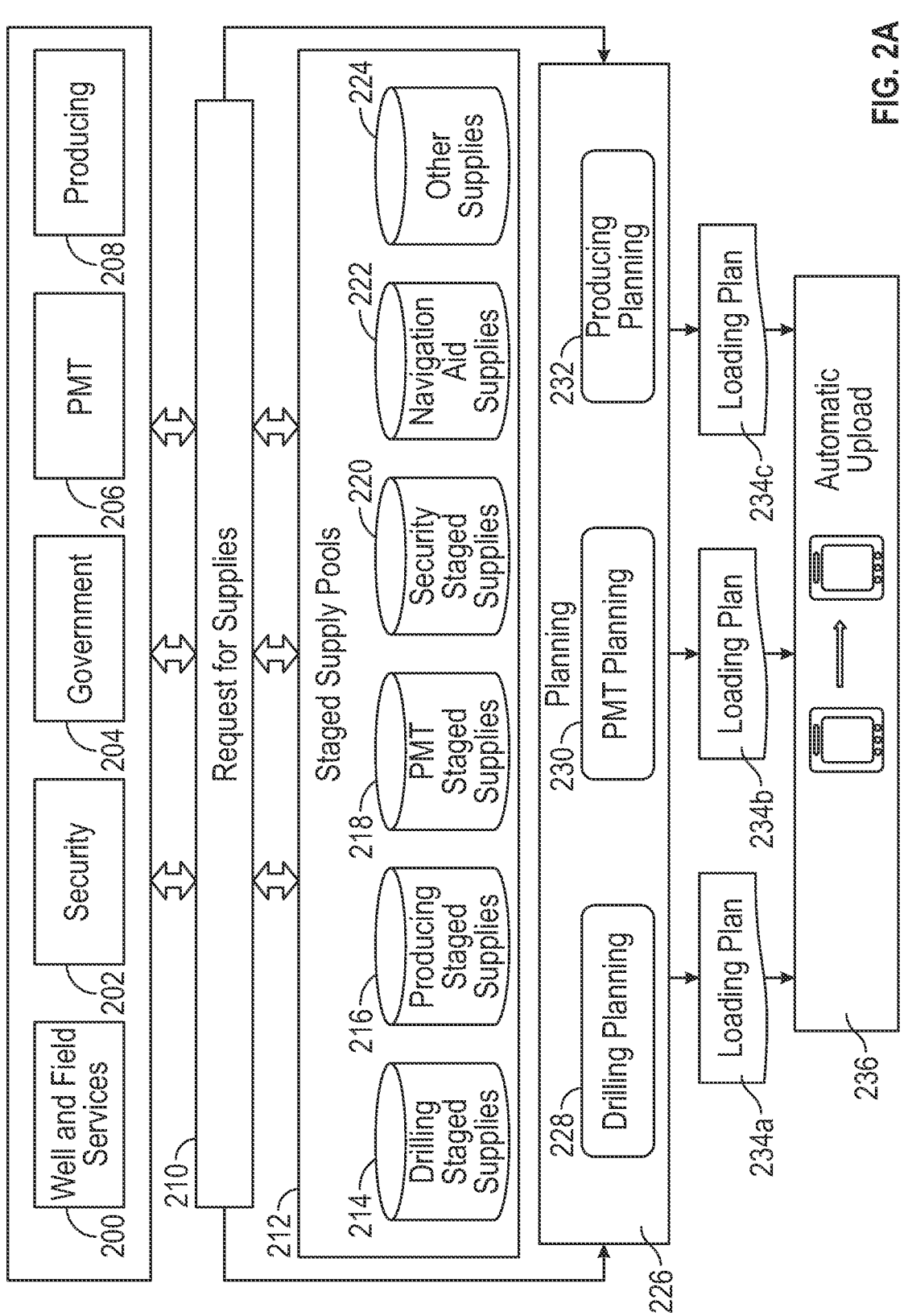
FIG. 2A illustrates a system for marine vessel management according to one or more embodiments of the present disclosure.
Figure 2B:
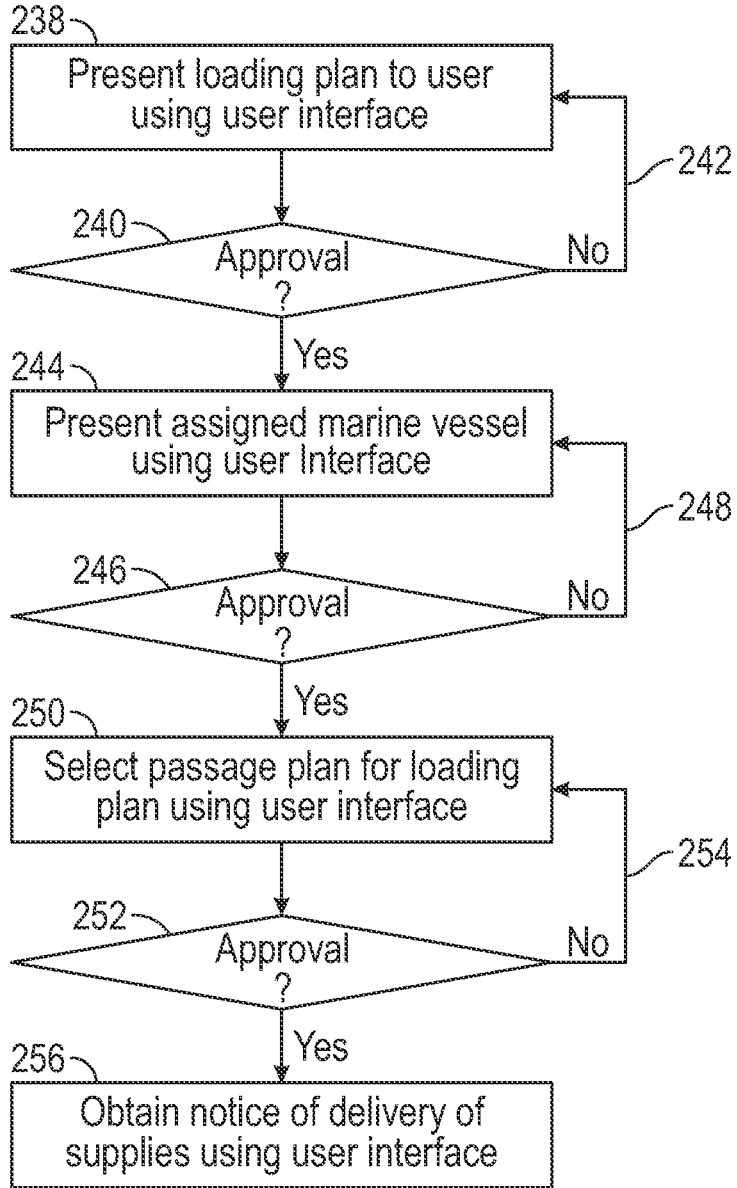
FIG. 2B illustrates a method for marine vessel management according to one or more embodiments of the present disclosure.

FIGS. 2A and 2B depict an overview of the system and method described herein, respectively. As shown in FIG. 2A, data is collected from different systems that are being utilized by various customers across an oil and gas company, such as well and field services 200, security 202, government 204, project management team (PMT) 206, and producing 208. Each of these systems may submit a request for supplies 210 from staged supply pools 212, which may include drilling staged supplies 214, producing staged supplies 216, PMT staged supplies 218, security staged supplies 220, navigation aid supplies 222, and other supplies 224 that may need to be shipped to offshore facilities. For the initiation of marine services, supply requests are sent to a central planning engine 226. The central planning engine 226 may provide functionality to the software application and organize functions of other programs, or modules. In one or more embodiments, the central planning engine 226 may include a plurality of planning modules, such as a drilling planning module 228, a PMT planning module 230, and a producing module 232.

The central planning engine 226 may consolidate all of the supply requests from marine customers to produce one or more loading plans 234a, 234b, and 234c based on the type of request. In one or more embodiments, the creation and generation of plans by the central planning engine 226 is performed outside of the software application described herein. The loading plan, or plans, may be wirelessly transmitted to mobile devices as well as desktop applications running the software application, allowing users to add a loading plan using an upload module 236. Loading plans are uploaded from the central planning engine 226 to the mobile software application.

In one or more embodiments, each loading plan comprises a list of supplies/equipment/materials that need to be shipped and delivered via a marine vessel. For the purposes of this disclosure, the terms "supplies", "equipment", and "materials" may be used interchangeably to refer to objects that are shipped and delivered via marine vessels. Each loading plan may include one or more of a textual description of each supply on the list, an image of each supply, a loading status of each supply (i.e., loaded or not loaded), and a desired quantity of each supply.

FIG. 2B depicts a method for marine vessel management according to one or more embodiments of the present disclosure. In block 238, the loading plan is presented to a vessel captain (or other user) engaging the system using a user interface. Following presentation of the loading plan to the user, a first approval decision 240 may be made by the user initially presented with the loading plan. The user may accept or reject the loading plan through a selectable user interface element displayed on the user interface of the user device. If the loading plan is rejected, the application may return to a list of loading plans for the user to select in option 242. In an alternate embodiment, the loading plan may be presented to a different user. The different user, such as a captain of a different marine vessel, may also choose to accept or reject the loading plan for their own vessel.

Once the loading plan is approved by a user, an analysis of the weight and dimensions of each supply may be performed. A recommendation may be generated for a specific marine vessel capable of receiving the supplies listed in the loading plan based on type, capacity, availability, and any other useful parameters. Once assigned, the assignment may be uploaded to the captain assistance dashboard accessible by the captain (and/or other users) of the assigned vessel from a module separate from the mobile software application described herein. The assigned marine vessel may be presented using the user interface in block 244. The captain assistance dashboard is a user interface that provides data visualizations of actions that may be taken using the software application described herein. A second approval decision 246 may be made regarding the vessel assignment. A user of the system may decide to approve or reject the vessel recommendation via a selectable user interface element displayed on the user interface of the user device. If the vessel assignment is rejected, a recommendation for a different marine vessel for the loading plan may be generated and presented to the user in option 248. In an alternate embodiment, the recommended marine vessel may be presented to a different user of the software application for approval or rejection.

Once the vessel assignment is approved, a modifiable passage plan may be selected for the loading plan via the user interface in block 250. As with the other steps, the selected passage plan may be approved or rejected by a vessel captain, or other user, in a third approval decision 252. A user of the system may decide to approve or reject the selected passage plan through a selectable user interface element displayed on the user interface of the user device. If the passage plan is rejected, a different passage plan may be selected by the user in option 254. Alternatively, the initially selected passage plan may be presented to a user of a different marine vessel for approval or rejection. In one or more embodiments, the rejected plan (e.g., loading plan, passage plan, assigned vessel) is returned to the entity (e.g., user) that created the plan.

Once approval is provided, the shipment of supplies of an approved loading plan on an approved marine vessel and following an approved passage plan proceeds. Specifically, the supplies of the approved loading plan may be loaded onto the assigned marine vessel, and the assigned marine vessel may navigate a route according to the approved passage plan. Once the marine vessel arrives at its intended destination and the supplies are unloaded from the vessel, a notice of delivery of the supplies may be obtained via the user interface in block 256. A user at the destination may also input details into the user interface, such as the time of delivery of the shipment, the condition of the one or more supplies received, and/or any additional information that may be helpful in managing future shipments.

FIGS. 3-8 depict various operations that may be performed via the system according to one or more embodiments of the present disclosure. As can be appreciated by one skilled in the art, FIGS. 3-8 are example actions that may be performed and are not intended to limit the software application to any particular function or operation. Selections of functions and operations may be received as input via touch on a touchscreen of the user device (e.g., tablet, smartphone). Alternatively, if the application is being accessed on a desktop or laptop computing device, selections may be made via a handheld pointing device (e.g., computer mouse) or touchpad.

Figure 3:
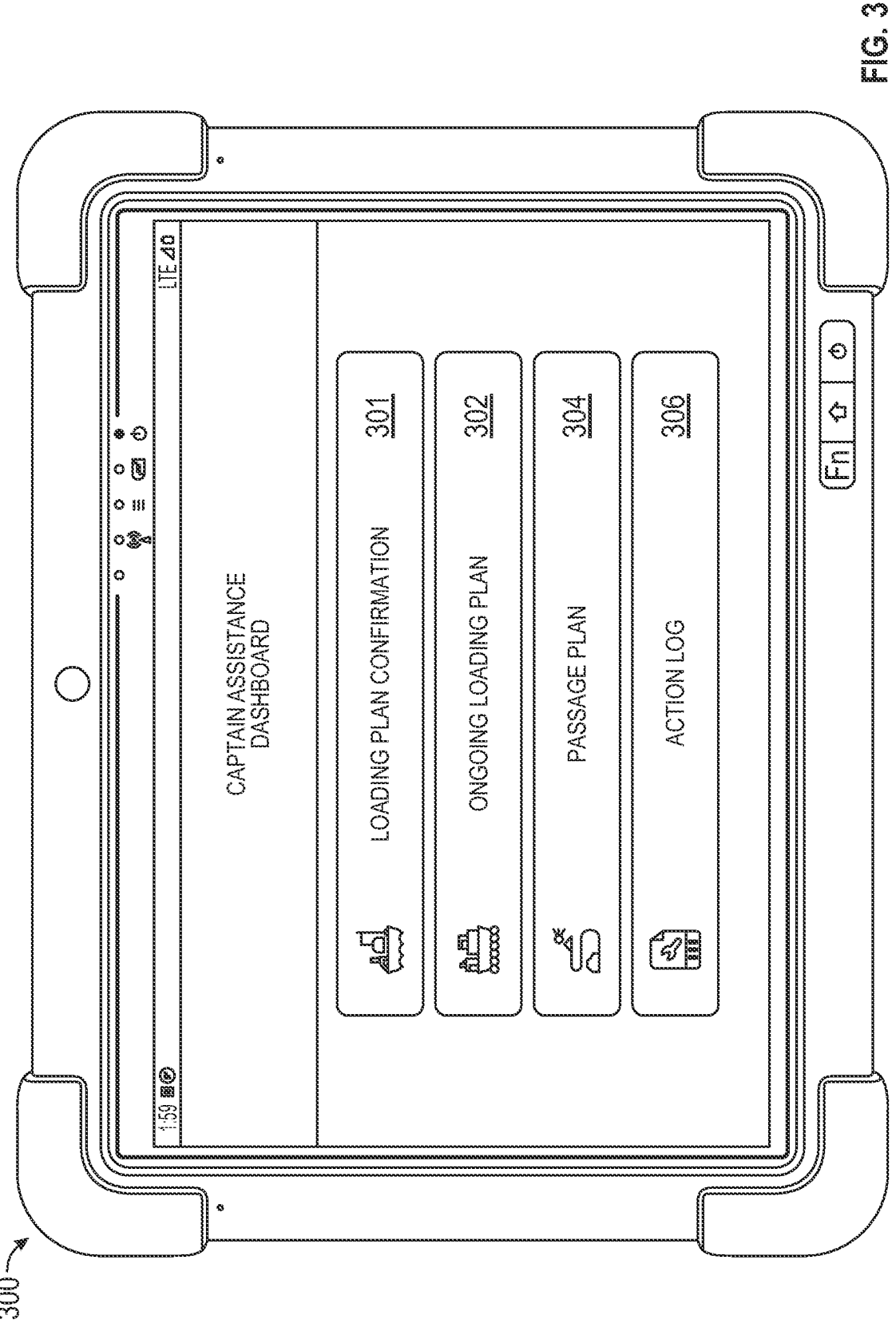
FIG. 3 is an illustration of a captain assistance dashboard graphical user interface (GUI) according to one or more embodiments of the present disclosure.

FIG. 3 illustrates a non-limiting example of a captain assistance dashboard 300. To log in to the captain assistance dashboard 300, a user may open the application on a user device (e.g., smartphone, tablet, laptop computer, desktop computer) to display a login page with entry fields for a login ID and password. The user may select an online or offline mode for the software application depending on the user's current network access. Because of the potential lack of connectivity due to the nature of marine transport activities, the offline mode allows a user to input information into the software application operating on the user device without Internet connectivity. In offline mode, the captain assistance dashboard 300 and subsequent modules display only previously saved data. The new input data may then be auto-synchronized once the user device is connected to a network.

The captain assistance dashboard 300 allows a user to navigate to different modules of the software application depending on the task to be completed. As shown in FIG. 3, there is a menu of selectable modules representing different functions or operations that may be performed via the software application, such as a "loading plan confirmation" module 301, an "ongoing loading plan" module 302, a "passage plan" module 304, and an "action log" module 306. When a given module is selected, the selected module is displayed on the user device display screen.

Figure 4:
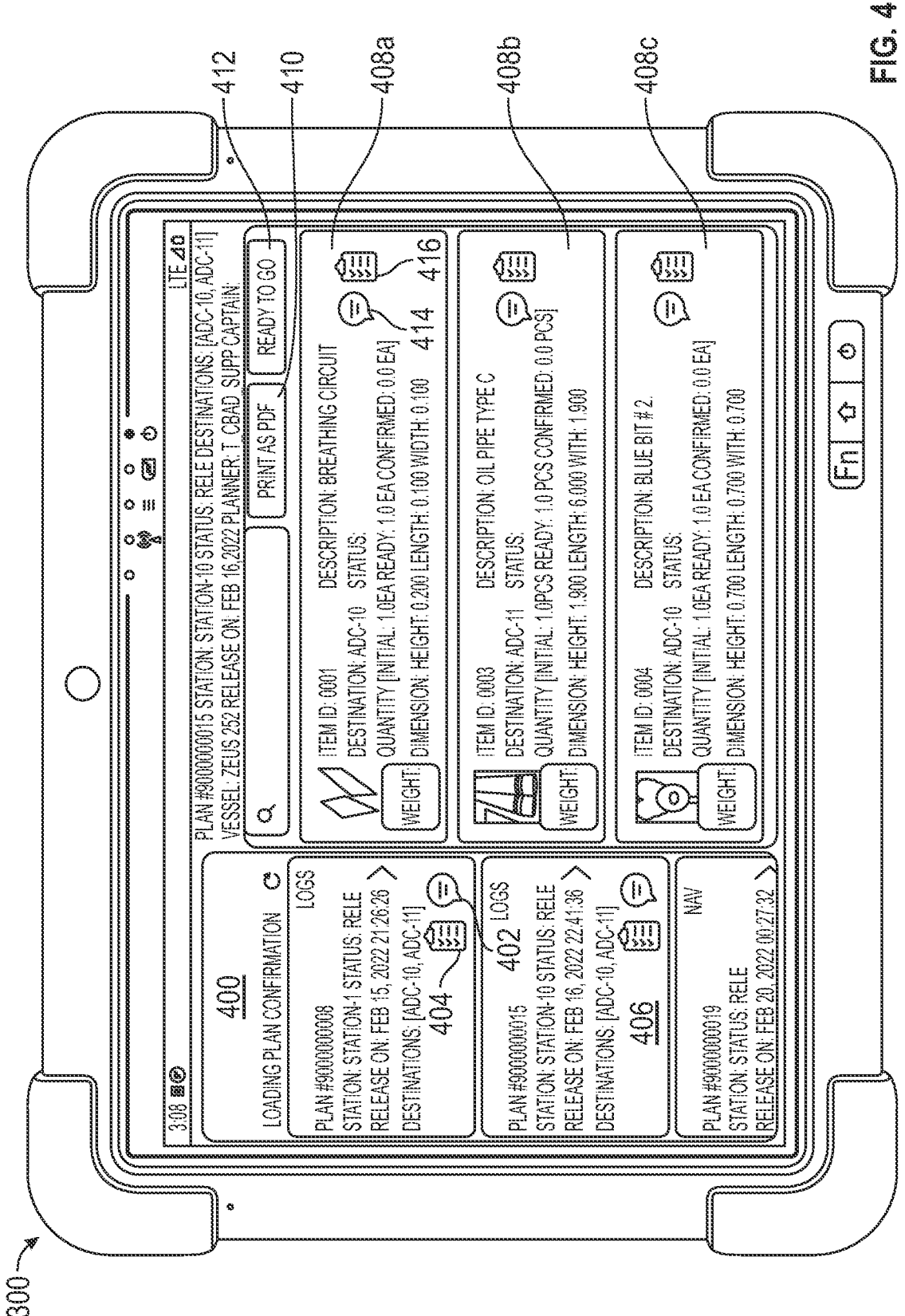
FIG. 4 is an illustration of a loading plan creation GUI according to one or more embodiments of the present disclosure.

FIG. 4 illustrates an exemplary display of the "loading plan confirmation" module 301. On the lefthand side of the display is a list 400 of loading plans that have "released" status. For the purposes of this disclosure "released" denotes that the plan has been sent to the next entity in the process chain. Each loading plan has two selectable buttons: an action button 402 and a note button 404. For the purposes of this disclosure, a "button" is a selectable area of the user interface designed to represent actions that a user may take while using the software application. A selected button may produce a drop-down menu, pop-up dialog, form, toolbar, new module, or the like. For instance, when a user selects a particular loading plan (e.g., 406), the materials/equipment included in the loading plan 406 may be listed on the right side, as shown in FIG. 4. Additionally, the list of materials/equipment may include data, such as item identification (ID), description, dimensions, and quantity.

A user may select a loading plan to obtain details related to the selected loading plan. Those skilled in the art will appreciate that the loading plan may be created by a planner function in a different module. For instance, in FIG. 4, loading plan 406 is selected. On the righthand side of the user interface is a series of dialog boxes 408*a*, 408*b*, 408*c*, where each dialog box presents data related to an item of equipment corresponding to loading plan 406. In one or more embodiments, the user interface includes a "print as PDF" button 410 and a "ready to go" button 412. The loading plan is displayed to a user (e.g., marine vessel captain) to allow the user to take an action (i.e., approve or reject) the loading plan. After the loading plan is finalized, the software application running on the one or more processors of the user device may analyze characteristics of the supplies in the supply list, such as dimensions (e.g., height, length, width) and, based on the characteristics, generate a recommendation, or proposal, of a marine vessel based on the vessel availability and type.

Figure 5:
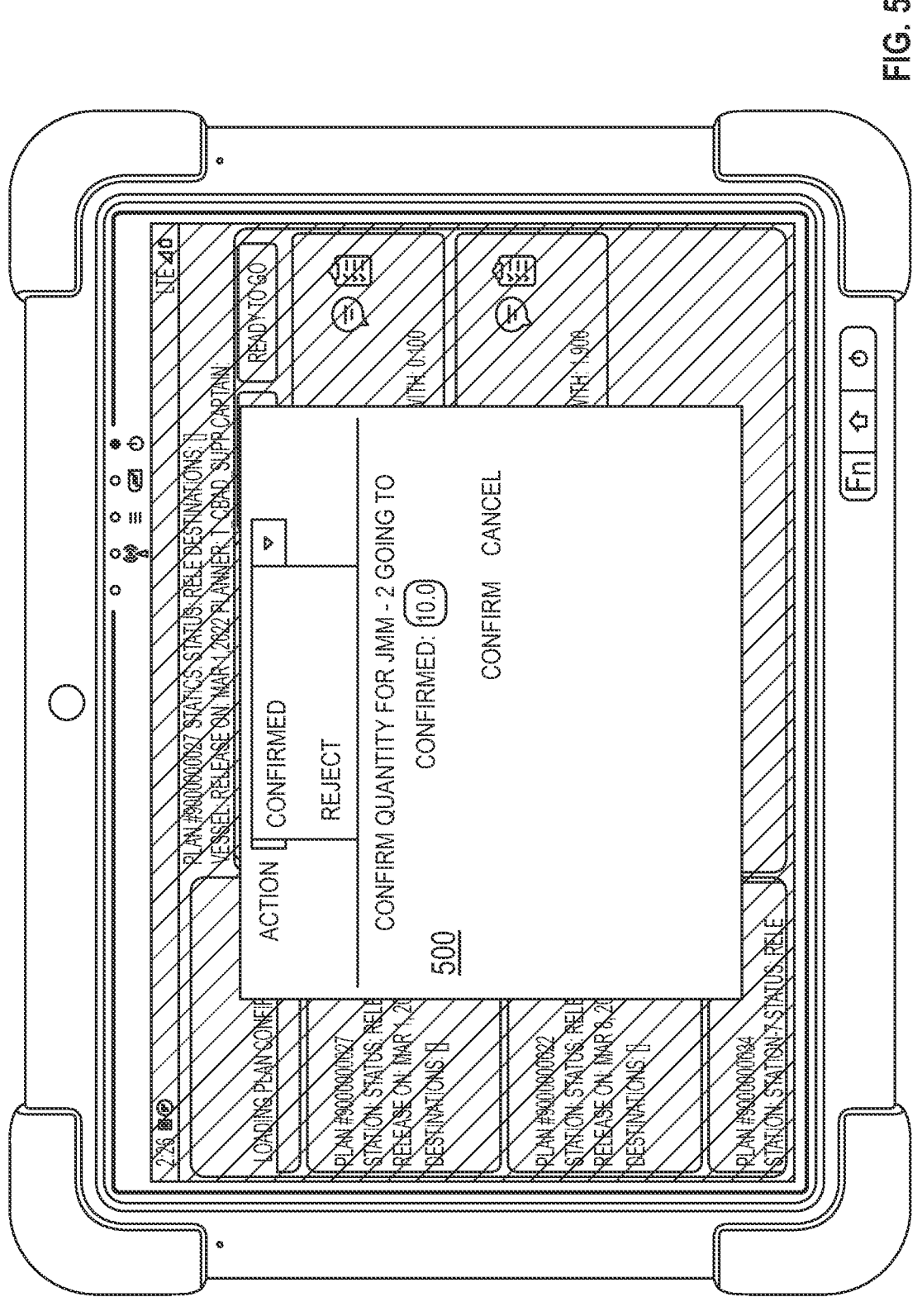
FIG. 5 is an illustration of a user action dialog according to one or more embodiments of the present disclosure.

When a user selects an action button 414 corresponding to a dialog box (e.g., 408*b*) for a specific supply, an action dialog 500, such as depicted in FIG. 5, is displayed. The action dialog 500 may be displayed as a drop-down menu with options to confirm or reject the supply. In the example shown in FIG. 5, a quantity (e.g., 10) of a selected item may be confirmed or rejected. Similarly, when an action button 402 is selected in the "loading plan confirmation" module 301 (FIG. 4), the user may confirm or reject the entire loading plan. When a user selects a notes button 416 corresponding to a dialog box (e.g., 408*b*) for a specific supply, a dialog may be displayed (not shown). The user may input data related to one or more supplies, including a textual description and/or visual media (e.g., images, videos), to generate a record of observations related to the specific supply. Similarly, when the user selects the notes button 404 on the "loading plan confirmation" module 301, textual data regarding the plan may be input by the user and uploaded to the software application. Once the user confirms or rejects supplies and the loading plan, the user may select the "ready to go" button 412 in the "loading plan confirmation" module 301. When the "print as PDF file" button 410 is selected, the software application generates a PDF version of the loading plan.

Referring again to FIG. 3, the "ongoing loading plan" module 302 may be selected from the captain assistance dashboard 300. Selection of the "ongoing loading plan" module 302 causes the user interface to display a list of loading plans having an "in progress" status. A user may navigate to the "passage plan" module 304 by selecting the "passage plan" button on the captain assistance dashboard 300 illustrated in FIG. 3. The user may then create a passage plan to generate a route for a marine vessel picking up or delivering supplies in a loading plan.

Figure 6:
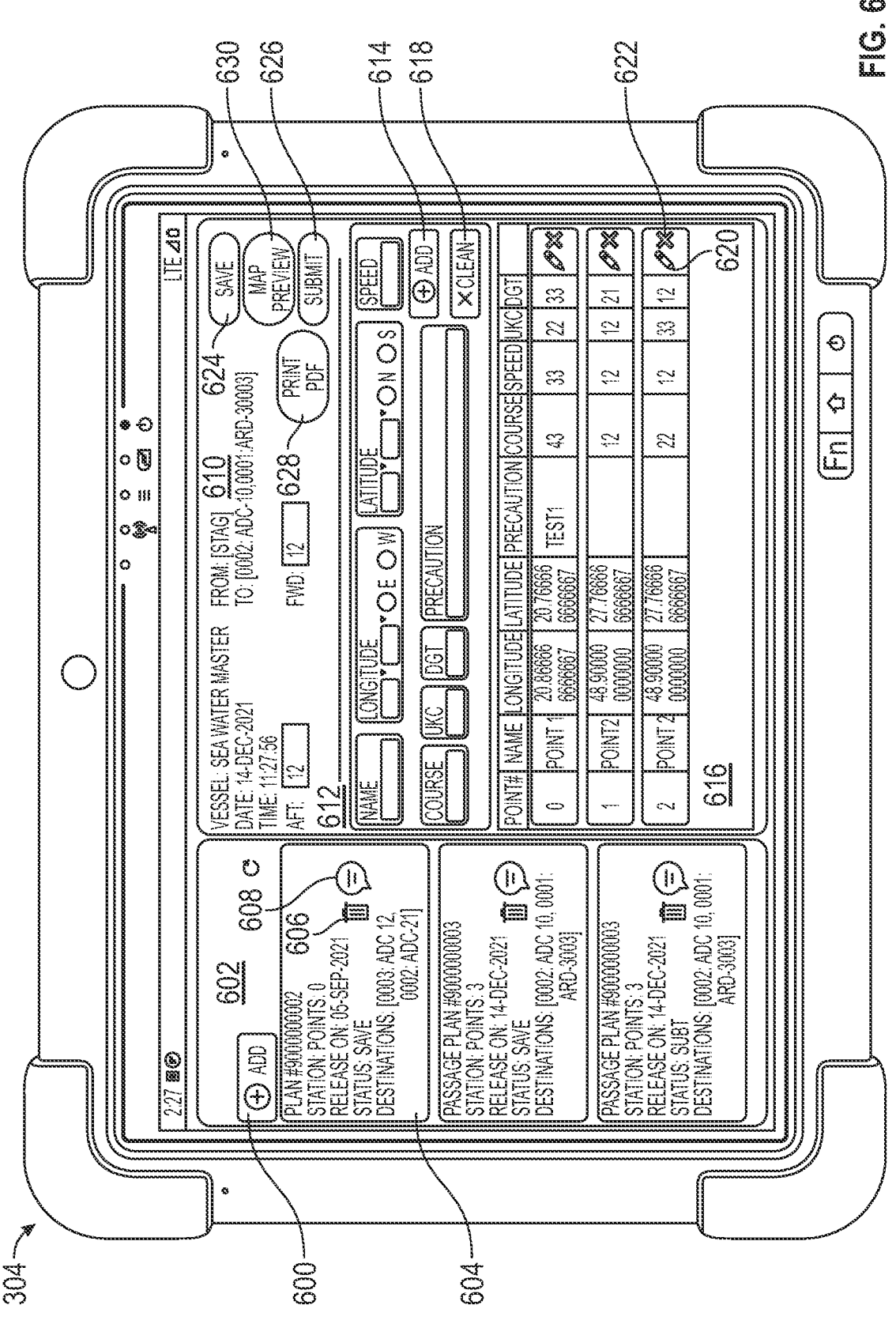
FIG. 6 is an illustration of a passage plan creation GUI according to one or more embodiments of the present disclosure.

FIG. 6 illustrates an exemplary display of the "passage plan" module 304. A passage plan may include multiple waypoints between a starting location and a destination. Each waypoint may be used as a geographical point of reference in the passage plan. A waypoint may be defined by its specific latitude and longitude. Waypoints may be added or modified via the user interface. The "passage plan" module 304 may display such data as the name of the marine vessel, date and time for the planned route, directional coordinates (i.e., longitude and latitude) of planned waypoints along a selected route, and options to add a new waypoint. Additionally, existing waypoints may be edited or removed via the "passage plan" module 304. "Map preview", "print", "save", and "submit" options are also accessible when using the "passage plan" module 304. Each of these selectable options is described in detail below.

When a user selects an "add" button 600, the user interface displays a pop-up screen prompting the user to choose a loading plan from which to create a passage plan. The user may then input an instruction via the software application to confirm or cancel the passage plan. Upon confirmation, the passage plan may be generated and added to the list with a corresponding "new" status.

Additionally, a user may select a passage plan from the passage plan list 602. Each passage plan (e.g., 604) may include a "delete" button 606, which allows a user to delete passage plans having a "new" status. If the status is other than "new", such as "saved" or "submitted", a notification that the passage plan may not be deleted is generated and displayed to the user. In addition, a "note" button 608 may be selected to upload text and/or images relevant to the selected passage plan (e.g., 604).

Following selection of a passage plan (e.g., 604), information related to the passage is displayed on the user interface. A passage plan detailed information section 610 comprises data fields that may be filled by a user, such as date, time, vessel name, and destination. A waypoint adding section 612 allows a user to edit the passage plan with information related to new or saved waypoints. A user may select the "add" button 614 to include a new waypoint in a way points list section 616 or select the "clear" button 618 to delete the information from the waypoint adding section 612.

The waypoints list section 616 includes all of the waypoints for the currently selected passage plan. Additionally, the waypoints list section 616 may include an edit button 620 and a delete button 622 for each waypoint. When the edit button 620 is selected for a particular waypoint, the information corresponding to the waypoint may be reproduced in the waypoint adding section 612 to permit a user to edit the waypoint information and save the updated information. When the delete button 622 is selected, a pop-up confirmation screen may appear on the display to confirm deletion of the selected waypoint.

Upon completion of the relevant information, a "save" button 624 may be selected to save the current passage plan. The passage plan will be saved but will not yet be processed. Upon selection of a "submit" button 626, the saved passage plan may be transmitted for review. A "print PDF" button 628 causes generation of a PDF file containing the passage plan and waypoints, which may then be wirelessly transmitted to a printing device. A "map review" button 630 on the display may be selected to allow a user to access a mapping application to view the route of waypoints on a map graphic displayed on the user interface.

Figure 7:
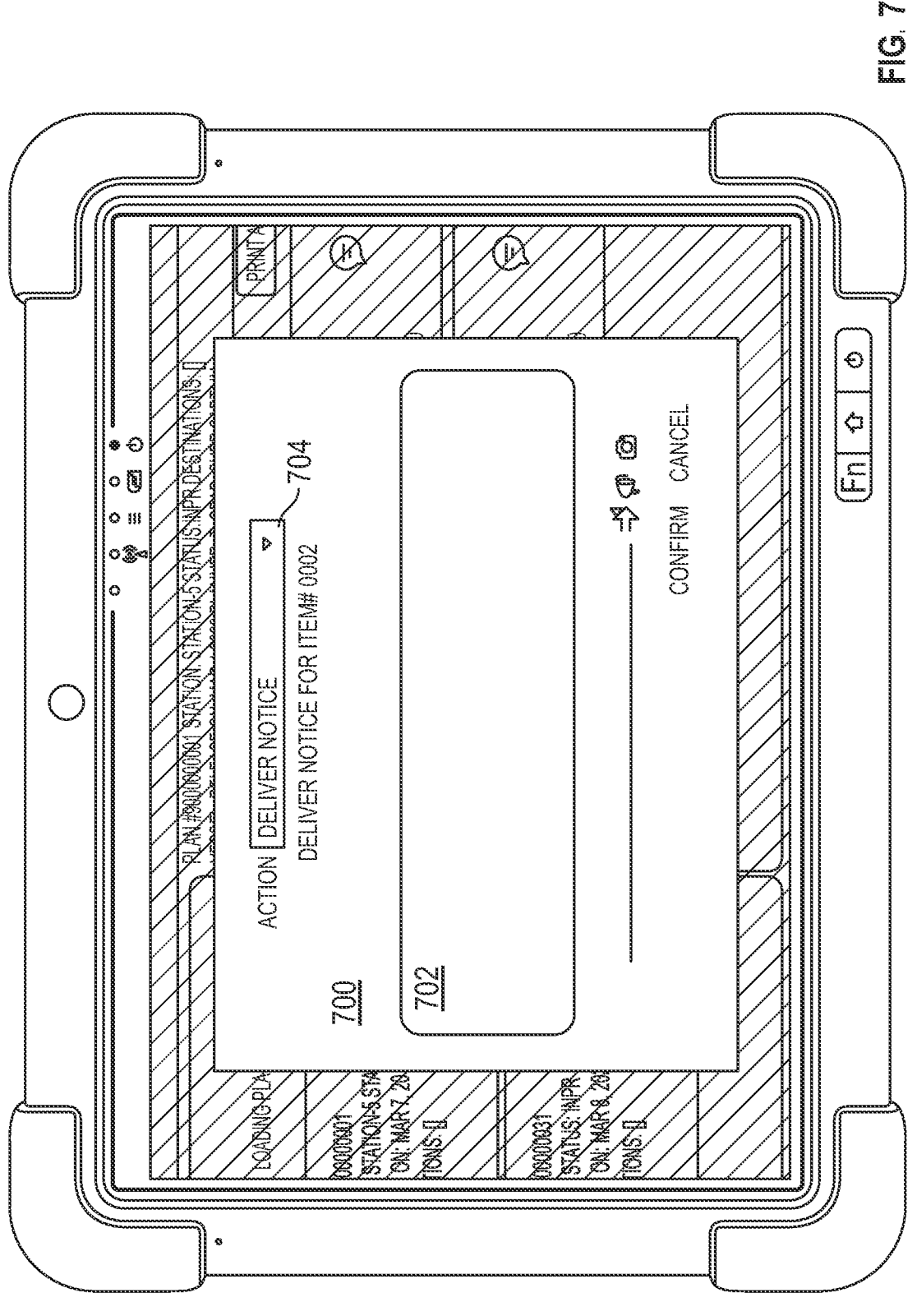
FIG. 7 is an illustration of a delivery notice dialog according to one or more embodiments of the present disclosure.

FIG. 7 depicts an exemplary action log page 700. To access the action log page 700, a user first navigates to the captain assistance dashboard 253 in FIG. 3 and selects the "action log" module 306. The action log page 700 includes a message section 702, which may list all available logs, and an add action button 704. Examples of actions that may be added to the log include a delivery notice, notice of material damage, and/or notice of harsh weather conditions that may affect delivery. A delivery notice, or other type of notice, logged onto the action log page 700 may be input by a user, such as an operator at an offshore rig, to indicate that the supplies in a loading plan have been delivered, for instance.

Figure 8:
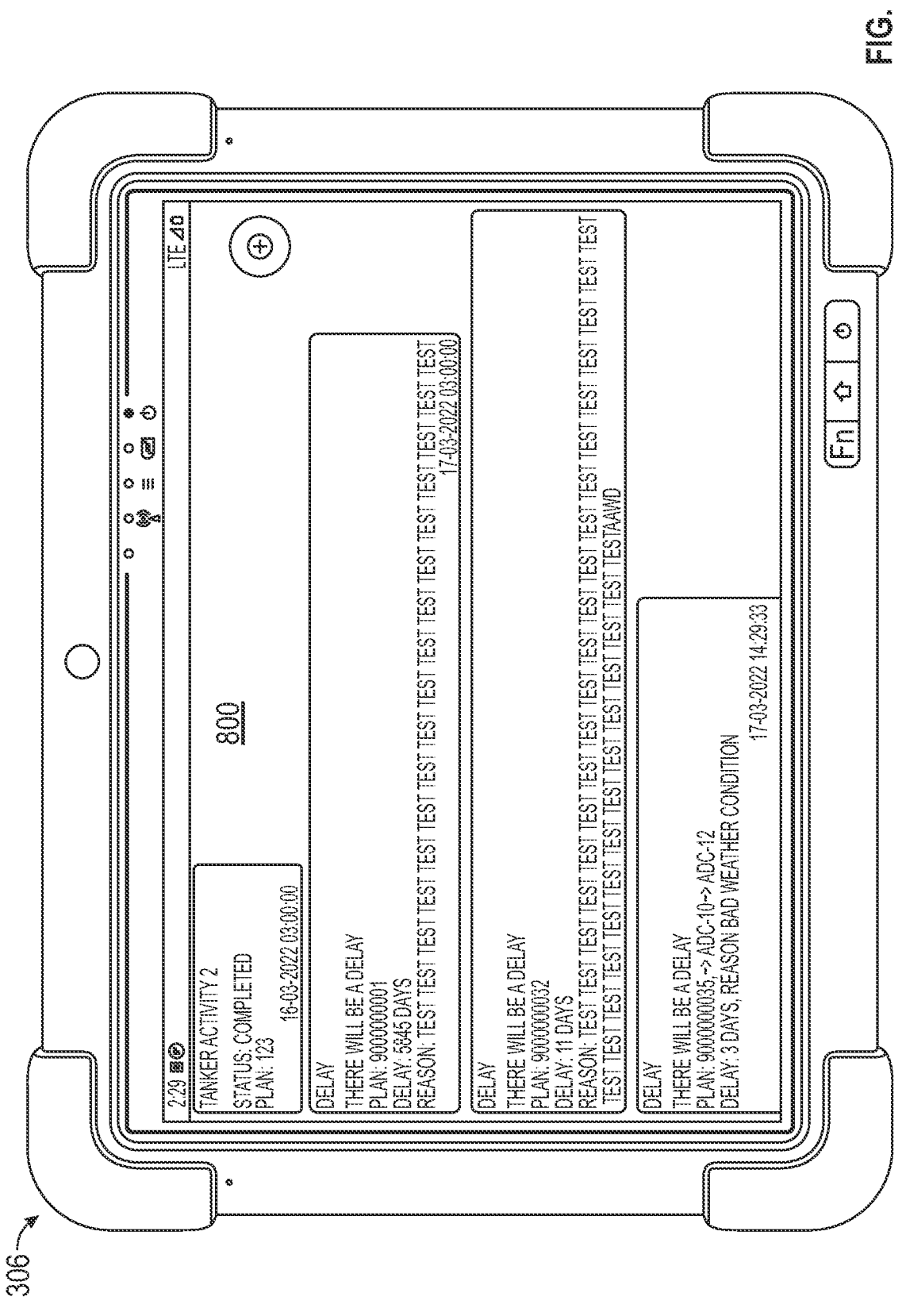
FIG. 8 is an illustration of a log page according to one or more embodiments of the present disclosure.

FIG. 8 is an illustration of an exemplary log page 800 according to one or more embodiments of the present disclosure. Multiple activities may be logged, including weather conditions affecting delivery of supplies and/or damage to delivered equipment. The example shown in FIG. 8 displays information related to shipment delays.

Figure 9:
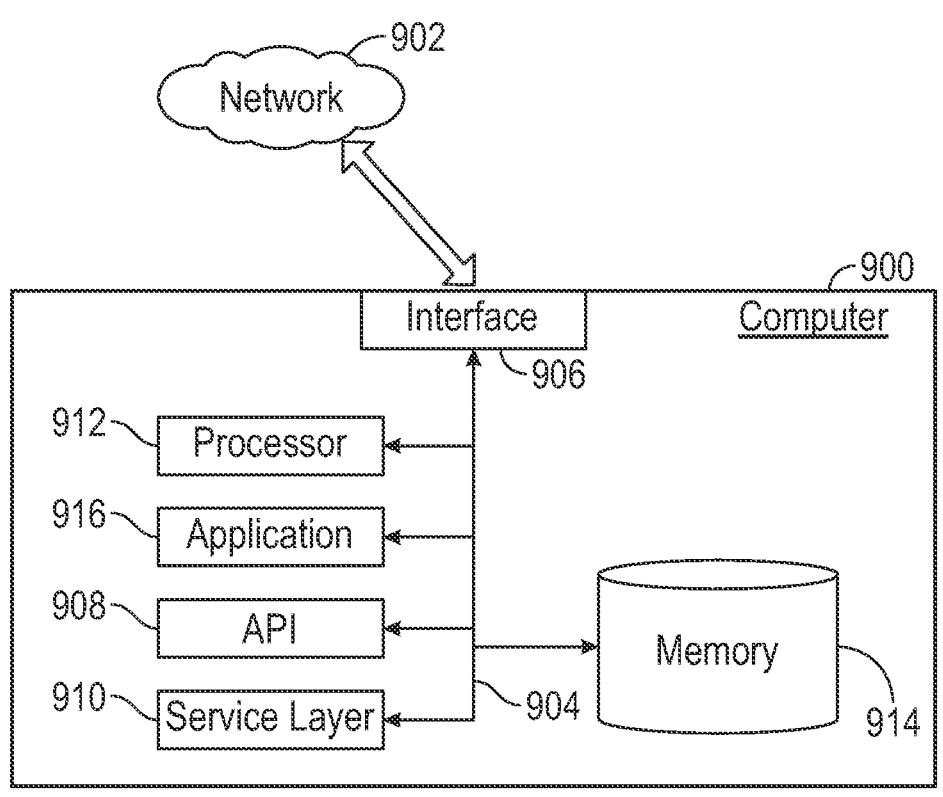
FIG. 9 is an illustration of a computing system in accordance with one or more embodiments of the present disclosure.

FIG. 9 further depicts a block diagram of a computer 900 used to provide computational functionalities associated with described analysis, methods, functions, processes, flows, and procedures as described in this disclosure, according to one or more embodiments. The illustrated computer 900 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 900 may include an input device, such as a keypad, keyboard, touch screen, or other device that can accept user information, and an output device that conveys information associated with the operation of the computer 900, including digital data, visual, or audio information (or a combination of information), or a GUI.

The computer 900 can serve in a role as a client, network component, a server, a database or other persistency, or any other component (or a combination of roles) of a computer system for performing the subject matter described in the instant disclosure. The illustrated computer 900 is communicably coupled with a network 902. In some implementations, one or more components of the computer 900 may be configured to operate within environments, including cloud-computing-based, local, global, or other environment (or a combination of environments).

At a high level, the computer 900 is an electronic computing device operable to receive, transmit, process, store, or manage data and information associated with the described subject matter. According to some implementations, the computer 900 may also include or be communicably coupled with an application server, e-mail server, web server, caching server, streaming data server, business intelligence (BI) server, or other server (or a combination of servers).

The computer 900 can receive requests over network 902 from a client application (for example, executing on another computer 900) and responding to the received requests by processing the said requests in an appropriate software application. In addition, requests may also be sent to the computer 900 from internal users (for example, from a command console or by other appropriate access method), external or third-parties, other automated applications, as well as any other appropriate entities, individuals, systems, or computers.

Each of the components of the computer 900 can communicate using a system bus 904. In some implementations, any or all of the components of the computer 900, both hardware or software (or a combination of hardware and software), may interface with each other or an interface 906 (or a combination of both) over the system bus 904 using an application programming interface (API) 908 or a service layer 910 (or a combination of the API 908 and service layer 910). The API 908 may include specifications for routines, data structures, and object classes. The API 908 may be either computer-language independent or dependent and refer to a complete interface, a single function, or even a set of APIs. The service layer 910 provides software services to the computer 900 or other components (whether or not illustrated) that are communicably coupled to the computer 900. The functionality of the computer 900 may be accessible for all service consumers using this service layer. Software services, such as those provided by the service layer 910, provide reusable, defined business functionalities through a defined interface. For example, the interface may be software written in JAVA, C++, or other suitable language providing data in extensible markup language (XML) format or another suitable format. While illustrated as an integrated component of the computer 900, alternative implementations may illustrate the API 908 or the service layer 910 as stand-alone components in relation to other components of the computer 900 or other components (whether or not illustrated) that are communicably coupled to the computer 900. Moreover, any or all parts of the API 408 or the service layer 910 may be implemented as child or sub-modules of another software module, enterprise application, or hardware module without departing from the scope of this disclosure.

The computer 900 includes an interface 906. Although illustrated as a single interface 906 in FIG. 9, two or more interfaces 906 may be used according to particular needs, desires, or particular implementations of the computer 900. The interface 906 is used by the computer 900 for communicating with other systems in a distributed environment that is connected to the network 902. Generally, the interface 906 includes logic encoded in software or hardware (or a combination of software and hardware) and operable to communicate with the network 902. More specifically, the interface 906 may include software supporting one or more communication protocols associated with communications such that the network 902 or interface's hardware is operable to communicate physical signals within and outside of the illustrated computer 900.

The computer 900 includes at least one computer processor 912. Although illustrated as a single computer processor 912 in FIG. 9, two or more processors may be used according to particular needs, desires, or particular implementations of the computer 900. Generally, the computer processor 912 executes instructions and manipulates data to perform the operations of the computer 900 and any algorithms, methods, functions, processes, flows, and procedures as described in the instant disclosure.

The computer 900 also includes a memory 914 that holds data for the computer 900 or other components (or a combination of both) that can be connected to the network 902. For example, memory 914 can be a database storing data consistent with this disclosure. Although illustrated as a single memory 914 in FIG. 9, two or more memories may be used according to particular needs, desires, or particular implementations of the computer 900 and the described functionality. While memory 914 is illustrated as an integral component of the computer 900, in alternative implementations, memory 914 can be external to the computer 900.

The application 916 is an algorithmic software engine providing functionality according to particular needs, desires, or particular implementations of the computer 900, particularly with respect to functionality described in this disclosure. For example, the application 916 can serve as one or more components, modules, applications, etc. Further, although illustrated as a single application 916, the application 916 may be implemented as multiple applications 916 on the computer 900. In addition, although illustrated as integral to the computer 900, in alternative implementations, the application 916 can be external to the computer 900.

There may be any number of computers 900 associated with, or external to, a computer system containing computer 900, wherein each computer 900 communicates over network 902. Further, the term "client," "user," and other appropriate terminology may be used interchangeably as appropriate without departing from the scope of this disclosure. Moreover, this disclosure contemplates that many users may use one computer 900, or that one user may use multiple computers 900.

In some embodiments, the computer 900 is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for marine vessel shipment management, comprising:

producing, with a central planning engine, one or more loading plans from a plurality of supply requests;

wirelessly transmitting the one or more loading plans from the central planning engine to a plurality of mobile communication devices in communication with one another, each mobile communication device comprising a computer processor, a touchscreen display, a camera, and a global positioning system (GPS);

displaying, at the touchscreen display, a plurality of touch selectable user interface elements;

receiving a first input via a first touch selectable user interface element of a user interface displayed on the touchscreen display;

in response to receiving the first input, displaying, at the touchscreen display, a prompt for a user to select a loading plan, wherein each loading plan comprises, for each supply, a textual description, an image, a loading status, and a quantity displayed at the touchscreen display;

receiving a second input via a second touch selectable user interface element of the user interface, the second input corresponding to a selection of a loading plan comprising one or more supplies to be shipped on a marine vessel;

in response to receiving the second input, displaying, at the touchscreen display, a prompt for a user to select a passage plan from a passage plan list;

receiving a third input via a third touch selectable user interface element of the user interface, the third input corresponding to a selection of a first passage plan from the passage plan list the first passage plan comprising a first route to an intended destination for delivery of the one or more supplies by an assigned marine vessel;

in response to receiving the third input, displaying, at the touchscreen display a way points section having a plurality of way points;

modifying, at the touchscreen display, the first passage plan by adding, via a fourth selectable user interface element of the user interface, at least one waypoint to the plurality of way points to the first passage plan, generating a new passage plan comprising a new route that is different than the first route to the intended destination;

loading the one or more supplies onto the assigned marine vessel;

wirelessly transmitting the new passage plan to a user interface on the assigned marine vessel;

navigating the assigned marine vessel according to the new route; and displaying, at the touchscreen display, a notice of delivery of the one or more supplies to the intended destination.

2. The method of claim 1, comprising providing, to the user interface of the one or more mobile communication devices, the loading plan for approval by a user.

3. The method of claim 1, comprising providing, to the user interface of the one or more mobile communication devices, the passage plan for approval by a user.

4. The method of claim 1, comprising generating, by the computer processor of the one or more mobile communication devices, a recommendation for assignment of the loading plan to the marine vessel based on at least one of size, location, and availability of a plurality of marine vessels.

5. The method of claim 4, comprising providing, to the user interface of the one or more mobile communication devices, the recommendation for approval by a user.

6. The method of claim 1, comprising inputting, using a selectable user interface element of the user interface of the one or more mobile communication devices, data related to the one or more supplies, the data comprising at least one of a textual description and an image.

7. The method of claim 1, comprising displaying, using the user interface of the one or more mobile communication devices, data related to the marine vessel, the data comprising directional coordinates of at least one waypoint.

8. The method of claim 1, comprising logging, via the user interface of the one or more mobile communication devices, data related to delivery of the one or more supplies, the data comprising at least one of a weather condition affecting delivery of the one or more supplies and damage to the one or more supplies.

9. A system for marine vessel shipment management, comprising:

a central planning engine for producing one or more loading plans from a plurality of supply requests;

one or more mobile communication devices comprising a touchscreen display and a computer processor, the one or more communication devices in communication with one another;

a server coupled to the one or more mobile communication devices, wherein each of the one or more mobile communication devices is configured to:

display, at the touchscreen display, a plurality of touch selectable user interface elements;

receive a first input via a first touch selectable user interface element of a user interface displayed on the touchscreen display;

in response to receiving the first input, display, at the touchscreen display, a prompt for a user to select a loading plan, wherein each loading plan comprises, for each supply, a textual description, an image, a loading status, and a quantity displayed at the touchscreen display:

receive a second input via a second touch selectable user interface element of the user interface, the second input corresponding to a selection of a loading plan comprising one or more supplies to be shipped on a marine vessel:

in response to receiving the second input, display, at the touchscreen display, a prompt for a user to select a passage plan from a passage plan list;

receive a third input via a third touch selectable user interface element of the user interface, the third input corresponding to a selection of a first passage plan from the passage plan list, the first passage plan comprising a first route to an intended destination for delivery of the one or more supplies by an assigned marine vessel;

in response to receiving the third input, display, at the touchscreen display a way points section having a plurality of way points;

modify, at the touchscreen display, the first passage plan by adding, via a fourth selectable user interface element of the user interface, at least one waypoint to the plurality of way points, generating a new passage plan comprising a new route to the intended destination that is different from the first route; and the assigned marine vessel configured for receiving the one or more supplies, navigating the new route, and delivering the one or more supplies to the intended destination.

10. The system of claim 9, wherein each of the one or more mobile communication devices is configured to:

provide, to the user interface of the one or more mobile communication devices, the loading plan for approval by a user.

11. The system of claim 9, wherein each of the one or more mobile communication devices is configured to:

provide, to the user interface of the one or more mobile communication devices, the passage plan for approval by a user.

12. The system of claim 9, wherein each of the one or more mobile communication devices is configured to:

generate a recommendation for assignment of the loading plan to the marine vessel based on at least one of size, location, and availability of a plurality of marine vessels.

13. The system of claim 12, wherein each of the one or more mobile communication devices is configured to:

provide, to the user interface of the one or more mobile communication devices, the recommendation for approval by a user.

14. The system of claim 9, wherein each of the one or more mobile communication devices is configured to:

input, using a selectable user interface element, data related to the one or more supplies, the data comprising at least one of a textual description and an image.

15. The system of claim 9, wherein each of the one or more mobile communication devices is configured to:

display, using the user interface, data related to the marine vessel, the data comprising directional coordinates of at least one waypoint.

16. The system of claim 9, wherein each of the one or more mobile communication devices is configured to:

log, using the user interface, data related to delivery of the one or more supplies, the data comprising at least one of a weather condition affecting delivery of the one or more supplies and damage to the one or more supplies.

* * * * *